(12) United States Patent
Yamazaki et al.

(10) Patent No.: US 7,147,331 B2
(45) Date of Patent: Dec. 12, 2006

(54) METHOD OF DRIVING A SPATIAL LIGHT MODULATOR AND PROJECTOR

(75) Inventors: Tetsuro Yamazaki, Suwa (JP); Hidehito Iisaka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 223 days.

(21) Appl. No.: 10/860,098

(22) Filed: Jun. 4, 2004

(65) Prior Publication Data

US 2005/0007563 A1  Jan. 13, 2005

(30) Foreign Application Priority Data

Jun. 13, 2003 (JP) ............................ 2003-169436
Mar. 10, 2004 (JP) ............................ 2004-067233

(51) Int. Cl.
*G03B 21/20* (2006.01)
*G03B 21/26* (2006.01)
*G03B 21/28* (2006.01)
*H04N 9/12* (2006.01)
*G02F 1/1335* (2006.01)

(52) U.S. Cl. ............................ 353/31; 353/85; 353/94; 353/99; 353/121; 348/742; 348/771; 349/7; 349/8

(58) Field of Classification Search ................ 353/30, 353/31, 37, 85, 94, 97, 99, 121, 84; 342/742, 342/771; 349/7, 8; 362/295; 348/742, 743, 348/771
See application file for complete search history.

(56) References Cited

U.S. PATENT DOCUMENTS

| | | | | |
|---|---|---|---|---|
| 5,565,933 A | * | 10/1996 | Reinsch | 348/742 |
| 5,686,939 A | | 11/1997 | Millward et al. | 345/148 |
| 5,971,545 A | | 10/1999 | Haitz | 353/31 |
| 6,281,949 B1 | | 8/2001 | Matsui et al. | 348/750 |
| 6,802,613 B1 | * | 10/2004 | Agostinelli et al. | 353/31 |
| 6,953,251 B1 | * | 10/2005 | Seki et al. | 353/85 |

FOREIGN PATENT DOCUMENTS

CN  1224169  7/1999
JP  08-051633  2/1996

* cited by examiner

*Primary Examiner*—Melissa Jan Koval
(74) *Attorney, Agent, or Firm*—Oliff & Berridge, PLC

(57) ABSTRACT

To reduce the color break-up and to provide high quality projection images. A method of driving a spatial light modulator, including generating a sub-frame pulse signal for a first colored light R1 through R8, B1 through B8, generating a sub-frame pulse signal for a second colored light G1 through G8, arranging the sub-frame pulse signals for the respective colored light so that at least three of the sub-frame pulse signals for the first colored light R1 through R8, B1 through B8 adjoin either one of the sub-frame pulse signals for the second colored light G1 through G8 during at least one frame of the image, and driving a plurality of movable mirror elements in accordance with the sub-frame pulse signals for the respective colored light arranged in arranging the sub-frame pulse signals, the movable mirror elements being alternatively moved at least to a first reflecting position and a second reflecting position.

9 Claims, 11 Drawing Sheets

METHOD OF DRIVING A SPATIAL LIGHT MODULATOR AND PROJECTOR

BACKGROUND OF THE INVENTION

1. Field of Invention

The present invention relates to a method of driving a spatial light modulator and a projector, and to a projector using a solid state light emitting element and a tilt mirror device. The present invention also relates other aspects of driving a spatial light modulator.

2. Description of Related Art

Projectors are a type of image display device. Projectors display images by projecting light (projection light) in accordance with image signals supplied from image supply devices, such as a computer. In the related art, very high pressure mercury lamps are mainly used as light source sections of projectors. Tilt mirror devices can be used as spatial light modulators for projectors. Further, color wheels are used in the projectors using very high pressure mercury lamps and tilt mirror devices in combination. The color wheels divide light from the light sources into red light (hereinafter R light), green light (hereinafter G light), and blue light (hereinafter B light).

The tilt mirror devices modulate each of the colored light divided by the color wheels in accordance with image signals. An example of the tilt mirror devices is DIGITAL MICROMIRROR DEVICE, which is trademark (hereinafter DMD™) and proposed by Texas Instruments Incorporated. An example of technology in which the color wheel and the DMD™ are combined is proposed in Japanese Unexamined Patent Publication No. 8-51633.

SUMMARY OF THE INVENTION

However, related art projectors using very high pressure mercury lamps, tilt mirror devices, and color wheels sometimes cause so-called color break-up that makes displayed images of the R light, the G light, and the B light be recognized as separated images. The color break-up often appears when moving images with moving outlines are displayed or the observer moves his or her view point on the screen. The color break-up may cause degradation of the image quality or fatigue in eyes of the observer due to the flickers in the images.

In order to reduce the likelihood or prevent the color break-up from occurring by increasing the frame frequency of the images, the frame frequency of the images must be increased dramatically. In order to dramatically increase the frame frequency of the images, it is required that the performance of the motors to rotate the color wheels and the performance of the drive circuit to process the increased amount of image signals are enhanced. The enhancement of the motor performance and the drive circuit performance gives rise to a higher-cost of the projectors. Furthermore, it can be imagined that the driving speed of the tilt mirror device cannot follow the increased frame frequency of the images. Therefore, it is difficult to control the color break-up only by increasing the frame frequency of the images. The color break-up is problematical because it causes degradation of the quality of the projected images. The present invention is for addressing the above problems and provides a method of driving a spatial light modulator offering high quality projection images with reduced color break-up and a projector having the spatial light modulator driven using the method of driving the spatial light modulator.

In order to address the above problems and obtain the advantages an aspect of, the present invention provides a method of driving a spatial light modulator that modulates incident light in accordance with a signal corresponding to an image including a signal corresponding to an image of first colored light and a signal corresponding to an image of second colored light, including generating no fewer than n and no more than $2^n$ ("n" denotes a positive integer.) of sub-frame pulse signals for the first colored light to express depth of the image of the first colored light using n bits, the sub-frame pulse signals for the first colored light respectively having weights corresponding to the first through nth bits, generating no fewer than m and no more than $2^m$ ("m" denotes a positive integer and is not less than n.) of sub-frame pulse signals for the second colored light to express depth of the image of the second colored light using m bits, the sub-frame pulse signals for the second colored light respectively having weights corresponding to the first through m bits, arranging the sub-frame pulse signals for the first colored light and the sub-frame pulse signals for the second colored light so that at least three of the sub-frame pulse signals for the first colored light adjoin either one of the sub-frame pulse signals for the second colored light during at least one frame of the image, and driving a plurality of movable mirror elements in accordance with the sub-frame pulse signals for the first colored light and the sub-frame pulse signals for the second colored light arranged in arranging the sub-frame pulse signals, the movable mirror elements being alternatively moved at least to a first reflecting position and a second reflecting position.

If the depth is expressed by, for example, eight bits, eight sub-frame pulse signals having the weights respectively corresponding to the first through the eighth bits. Here, "the weights" are realized with durations of the sub-frame pulse signals. In the arranging the sub-frame pulse signals, the sub-frame pulse signals for the first colored light and the sub-frame pulse signals for the second colored light are arranged so that at least three of the sub-frame pulse signals for the first colored light adjoin either one of the sub-frame pulse signals for the second colored light. By thus arranging the sub-frame pulse signals for the first colored light and the sub-frame pulse signals for the second colored light, the number of the sub-frame pulse signal combinations having one of the sub-frame pulse signals for the first colored light and one of the sub-frame pulse signals for the second colored light adjacent to each other can be increased by at least one in one frame period. By increasing the number of the sub-frame pulse signal combinations having one of the sub-frame pulse signals for the first colored light and one of the sub-frame pulse signals for the second colored light adjacent to each other, the number of times of switching between the sub-frame pulse signals for the first colored light and the sub-frame pulse signals for the second colored light in one frame period can be increased.

Furthermore, each of the sub-frame pulse signals having the weight corresponding to respective one of the first through the eighth bits can further be divided. If the depth is expressed by eight bits, it can be divided into 256 sub-frame pulse signals each having the weight corresponding the first, specifically the least significant bit. By dividing the sub-frame pulse signals for one colored light having, for example, the weight corresponding to the eighth bit and arranging the divided sub-frame pulse signals to be adjacent to the sub-frame pulse signals for another colored light, the number of times of the color switching can further be increased.

After thus arranging the sub-frame pulse signals, the first colored light is supplied in sync with the sub-frame pulse signals for the first colored light, and the second colored light is supplied in sync with the sub-frame pulse signals for the second colored light. The more the number of the combinations in which one of the sub-frame pulse signals for the first colored light and one of the sub-frame pulse signals for the second colored light are arranged adjacent to each other becomes, the more switching between the first colored light and the second colored light in one frame period can be provided. By increasing the number of times of switching the first colored light and the second colored light, it is possible to reduce the likelihood or prevent the displayed images of the R light, the G light, and the B light from being recognized as separated images while maintaining the frequency of the image signals. Thus, the color break-up can be reduced to provide high quality projection images.

Note that the arrangement in which all of the sub-frame pulse signals for one colored light are adjacent to the sub-frame pulse signals for an other colored light is not required. For example, during at least a single frame period, a part of the sub-frame pulse signals can be arranged adjacent to the sub-frame pulse signals for the same colored light. If the color switching rate is high enough, the color break-up can be reduced even if some of the sub-frame pulse signals for the same colored light are adjacent to each other. Further, since the number of times of the color switching can be reduced, the light source can be driven by a simpler circuit. If the color switching can be performed in a substantially constant frequency, the light source can be driven more simply. Thus, the composition of the drive circuit can be simplified to reduce the cost of the projector. Further, if the combination of the sub-frame pulse signals for each colored light is arranged to have nearly the same weight, the color switching can be performed in an almost constant frequency. Thus, the drive circuit for the light source can be of simpler composition.

Furthermore, as an exemplary embodiment of the present invention, the sub-frame pulse signals for the first colored light and the sub-frame pulse signals for the second colored light may be arranged in the arranging the sub-frame pulse signals so that each of the sub-frame pulse signals for the first colored light adjoins either one of the sub-frame pulse signals for the second colored light during at least one frame of the image.

By thus arranging each of the sub-frame pulse signals for the first colored light to be adjacent to either one of the sub-frame pulse signals for the second colored light, a large number of combinations in which the sub-frame pulse signals for the first colored light and the sub-frame pulse signals for the second colored light are adjacent to each other can be provided. By providing a large number of combinations in which the sub-frame pulse signals for the first colored light and the sub-frame pulse signals for the second colored light are adjacent to each other, a large number of switching between the first colored light and the second colored light can be performed. By switching the first colored light and the second colored light more times, it is possible to reduce the likelihood or prevent the displayed images of the R light, the G light, and the B light from being recognized as separated images. Thus, the color break-up can be reduced to provide high quality projection images.

Furthermore, as an exemplary embodiment of the present invention, in the arranging the sub-frame pulse signals, the sub-frame pulse signals for the first colored light and the sub-frame pulse signals for the second colored light may be arranged so that the sub-frame pulse signals for the first colored light and the sub-frame pulse signals for the second colored light further adjoin each other with regard to each of the weights including the minimum weight through the maximum weight during at least one frame of the image. Thus, the color break-up can be reduced to provide high quality projection images.

Furthermore, as an exemplary embodiment of the present invention, defining a sub-frame pulse signal combination as a combination of the sub-frame pulse signals for the first colored light and the sub-frame pulse signals for the second colored light arranged in the arranging the sub-frame pulse signals so that the sub-frame pulse signals for the first colored light and the sub-frame pulse signals for the second colored light adjoin each other, more than one sub-frame pulse signal combinations may be provided in one frame of the image in repeating fashion. Thus, the color break-up can further be reduced to provide high quality projection images by increasing the driving frequency of the spatial light modulator.

Furthermore, as an exemplary embodiment of the present invention, in the arranging the sub-frame pulse signals, patterns of the arrangement of the sub-frame pulse signals for the first colored light and the sub-frame pulse signals for the second colored light may be decided to be different from each other in accordance with the scene shown in the image. By deciding patterns of the arrangement of the sub-frame pulse signals for the first colored light and the sub-frame pulse signals for the second colored light to be different from each other by the scene, it is possible to reduce or prevent the lighting durations of the first light source to supply the first colored light and the second light source to supply the second colored light from being concentrated to a certain area of the time line in one frame period. Further, the arrangement of the sub-frame pulse signals for the first colored light and the sub-frame pulse signals for the second colored light can be more suitable for the scene shown in the image. Thus, the flickers in the projection images can be reduced, and further, high quality projection images suitable for the scene shown in the images can be provided.

Furthermore, as an exemplary embodiment of the present invention, the first colored light may include red light and blue light, and the second colored light may include green light. Thus, the color break-up in full color projection images can be reduced. Further, the number of bits for expressing depth of the image of the first colored light and the number of bits for expressing depth of the image of the second colored light may be equal. By making the number of bits to express depth of the image of the first colored light and the number of bits to express depth of the image of the second colored light equal, the sub-frame pulse signals for the first colored light and the sub-frame pulse signals for the second colored light can be arranged to be exactly one after the other during at least one frame period. Thus, the color break-up can be reduced to provide high quality projection images.

Furthermore, according to an aspect of the present invention, the following projector can be provided. Specifically, the projector includes a light source section to supply first colored light and second colored light, a spatial light modulator including a tilt mirror device equipped with a plurality of movable mirror elements alternatively moved at least to a first reflecting position and a second reflecting position, and to modulate incident light in accordance with a signal corresponding to an image, and a projection lens to project the light modulated by the spatial light modulator, the spatial light modulator being driven using the method of driving a spatial light modulator as describe above. By driving the spatial light modulator of the projector using the method described above, the color break-up can be reduced to provide projectors offering high quality projection images.

Furthermore, as an exemplary embodiment of the present invention, the light source section may include a solid state light emitting element, and may supply the first colored light in sync with the sub-frame pulse signals for the first colored light and may supply the second colored light in sync with the sub-frame pulse signals for the second colored light. The solid state light emitting element can be switched on or off quickly and with high frequency. Therefore, if the sub-frame pulse signals for the first colored light and the sub-frame pulse signals for the second colored light are arranged to be one after the other resulting in the sub-frame pulse signals for the respective colored light being switched quickly and in high frequency, only the light corresponding to the sub-frame pulse signals can be sequentially lighted. Thus, switching of the colored light and switching of the sub-frame pulse signals can exactly be synchronized.

DETAILED DESCRIPTION OF EXEMPLARY EMBODIMENTS

Exemplary embodiments of the present invention are hereinafter described in detail referring to the accompanying drawings.

Exemplary Embodiment 1

Figure 1:
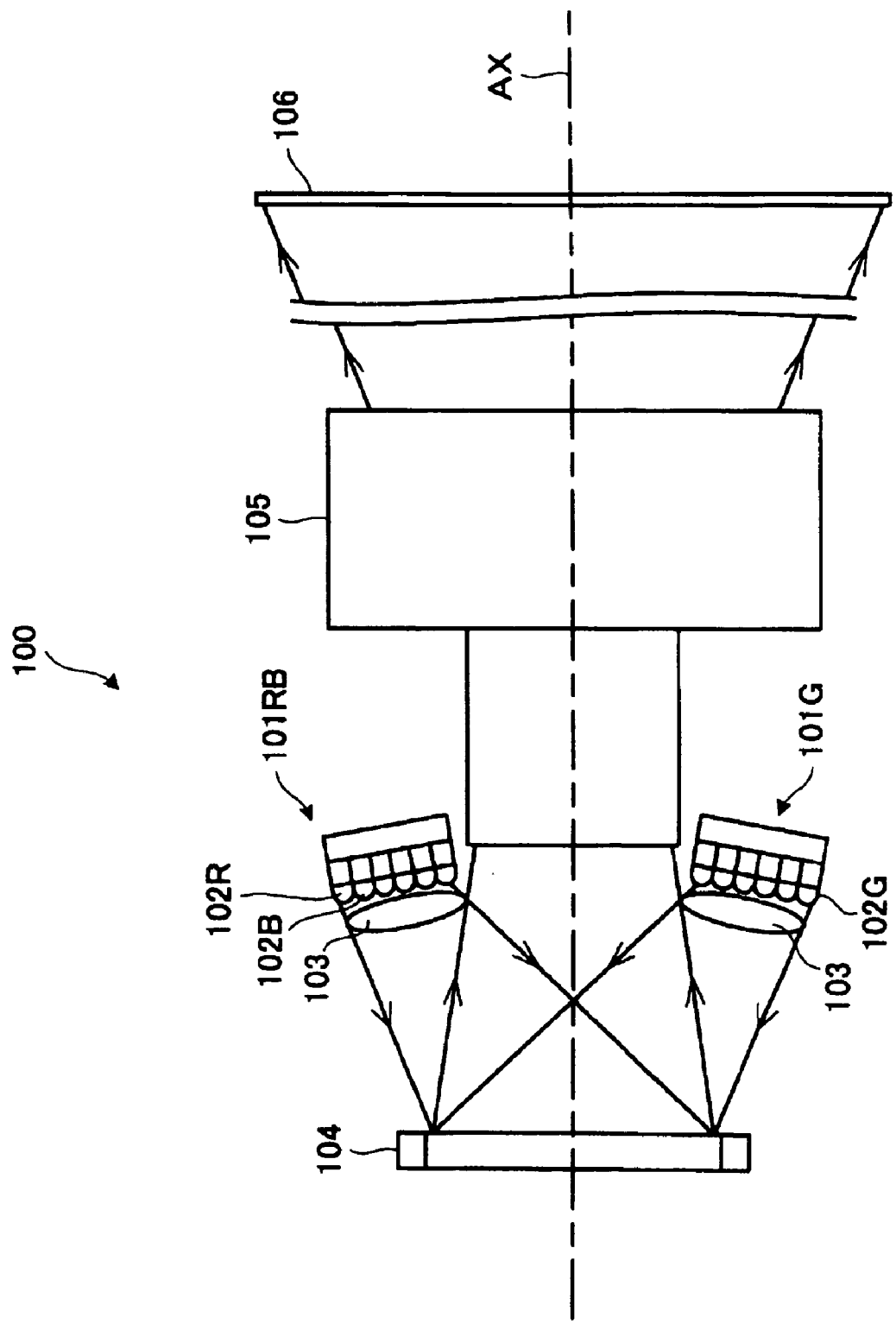
FIG. 1 is a schematic showing a configuration of a projector according to a first exemplary embodiment of the present invention.

First, with reference to FIGS. 1, 2, and 3 an outline of a projector according to the first exemplary embodiment of the present invention is explained. Then characteristic matters of aspects of the present invention are described referring to FIG. 4 and thereafter. FIG. 1 shows a schematic of a projector 100 according to the first exemplary embodiment of the present invention. The projector 100 includes a first light source section 101RB and a second light source section 101G. The first light source section 101RB and the second light source section 101G are substantially symmetrically positioned with respect to a light axis AX.

Each of the first light source section 101RB and the second light source section 101G includes light emitting diode component (hereinafter as LED) which is a solid state light emitting element. Each of the first light source section 101RB and the second light source section 101G includes a plurality of LEDs. The first light source section 101RB includes LEDs 102R for red light (hereinafter R light) to supply the R light as a first colored light and LEDs 102B for blue light (hereinafter B light) to supply the B light as the first colored light. The second light source section 101G includes LEDs 102G for green light (hereinafter G light) to supply the G light as a second colored light.

The light beams supplied from the first light source section 101RB and the second light source section 101G enter a spatial light modulator 104 after being transmitted through field lenses 103 respectively. Each of the field lenses 103 has a function of telecentrically lighting the spatial light modulator 104, specifically, the function of making the light as parallel as possible to its principal ray and then enter the spatial light modulator 104. The projector 100 makes images of the first light source section 101RB and the second light source section 101G focus on a projection lens 105 at its entrance pupil. Therefore, the spatial light modulator 104 is Koehler-illuminated by light beams supplied from the first light source section 101RB and the second light source section 101G.

The spatial light modulator 104 modulates incident light in accordance with image signals. Tilt mirror devices can be used as the spatial light modulator 104. An example of the tilt mirror devices is DMD™ proposed by Texas Instruments Incorporated. The projection lens 105 projects the light modulated by the spatial light modulator 104 on a screen 106. The spatial light modulator 104 is equipped with a plurality of movable mirror elements (not shown in the drawings) on its side facing the projection lens 105. The movable mirror element is alternately positioned on a first reflecting position or a second reflecting position to reflect incident light to a direction towards the projection lens 105 or a direction other than the direction towards the projection lens 105. The light propagates in the direction towards the projection lens 105 forms a projection image on the screen 106.

Hereinafter, lighting time and lighting timing of the LEDs 102R for the R light, the LEDs 102G for the G light, and the LEDs 102B for the B light are described using FIGS. 2A and 2B. In order to obtain white projection images by sequentially projecting the R light, the G light, and the B light, flux of the G light need to make up 60 through 80 percent of the total flux. If the LEDs 102R, 102G, and 102B for the respective colored light have the same output and the same number, the flux of the G light is not enough.

Figure 2A:
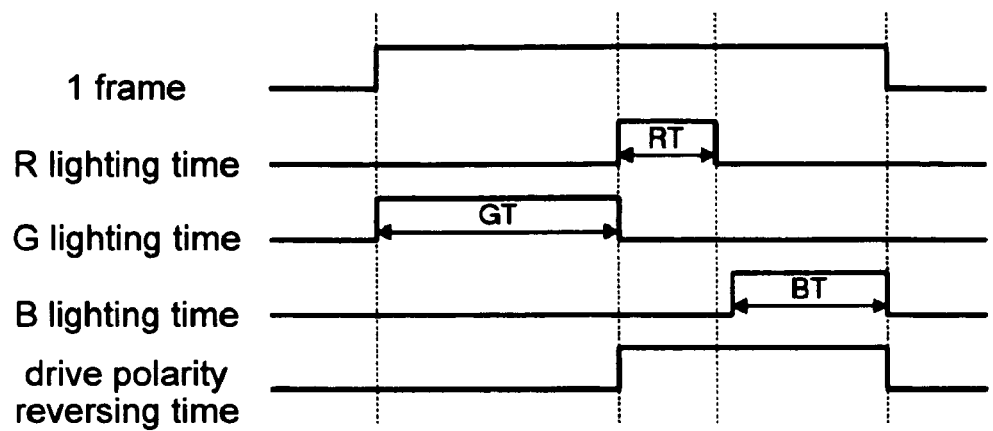
FIG. 2A is a time chart showing an example of lighting time of LED for respective colored light.
Figure 2B:
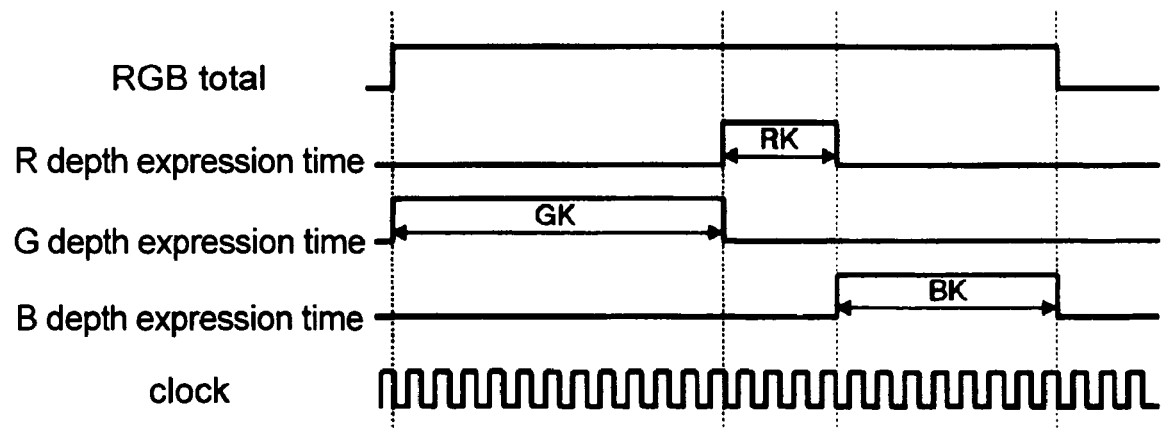
FIG. 2B is a time chart showing an example of lighting period of LED for respective colored light.

Therefore, as shown in FIG. 2A, the lighting time GT of the LEDs 102G for the G light is set to be longer than any of the lighting time RT of the LEDs 102R for the R light and the lighting time BT of the LEDs 102B for the B light. FIG. 2B shows a condition where the color tone of the projection image is adjusted by changing depth expression time. The depth expression time is defined as time duration necessary for the spatial light modulator 104 to realize strength (depth) corresponding to the image signals for the respective colored light. The respective depth expression time equals to sub-frame duration of the images corresponding to the respective colored light.

If the depth of the image is expressed with n bits (n is a positive integer), the length of the unit bit of the depth expression time GK for the G light can be set to be different from the length of the unit bit of the depth expression time RK or BK for the R light or the B light. Further, by increasing the number of the LEDs 102G for the G light to be greater than any of the LEDs 102R for the R light and the LEDs 102B for the B light, the lighting time GT of the LEDs 102G for the G light can also be set equal to or even shorter than the lighting time RT of the LEDs 102R for the R light or the lighting time BT of the LEDs 102B for the B light.

Further, as described above, the LEDs 102R for the R light and the LEDs 102B for the B light are disposed in one position while the LEDs 102G for the G light is disposed in another position, the two positions being symmetrical with respect to the optical axis of the projection lens 105. The LEDs 102G for the G light are disposed with a predetermined spatial distance from the LEDs 102R for the R light and the LEDs 102B for the B light. Therefore, the number of the LEDs 102G for the G light can easily be increased to be greater than any of the numbers of the LEDs 102R for the R light and the LEDs 102B for the B light. As a result, projection images with good color balance can be obtained by a simple structure.

As described above, the movable mirror element of the spatial light modulator 104 alternately reflects the incident light in the direction towards the projection lens 105 or another direction than towards the projection lens 105. Furthermore, the LEDs 102R for the R light and the LEDs 102B for the B light are disposed in one position while the LEDs 102G for the G light is disposed in another position, the two positions being symmetrical with respect to the optical axis of the projection lens 105. Therefore, the reflective surface of the movable mirror element of the spatial light modulator 104 need to be switched between two opposing angles according to whether the G light is reflected towards the projection lens 105 or the R light and the B light are reflected towards the projection lens 105. To cope with this, as shown in FIG. 2A, a drive polarity of the movable mirror element is reversed according to which LEDs are to be lighted, i.e., the lighting time GT of the LEDs 102G for the G light or the lighting time RT, BT of the LEDs 102R, 102B for the R, B light. Thus, full color images can be projected.

Figure 3A:
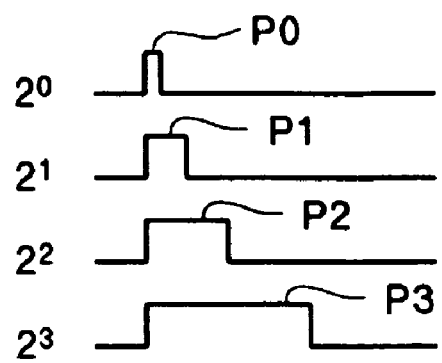
FIG. 3A is a time chart for explaining the pulse width modulation.

Hereinafter, a method of driving the movable mirror element of the spatial light modulator 104 is described. The projector 100 according to the present exemplary embodiment expresses the depth of images by a sub-frame drive method utilizing the pulse width modulation (hereinafter PWM). FIG. 3A shows sub-frame pulse signals for the PWM. First, the case of expressing one image with 16 levels of depth (4 bits) is explained as an example. If the depth is expressed with four bits, four sub-frame pulse signals P0 ($=2^0$), P1 ($=2^1$), P2 ($=2^2$), and P3 ($=2^3$) having weights respectively corresponding to the four bits are used. In this case, the weights are realized by deciding duration of the sub-frame pulse signals so as to correspond to the respective bits. Taking the horizontal axis as the time axis, the sub-frame signals can be expressed as square waves respectively having widths as shown in FIG. 3A.

Figure 3B:
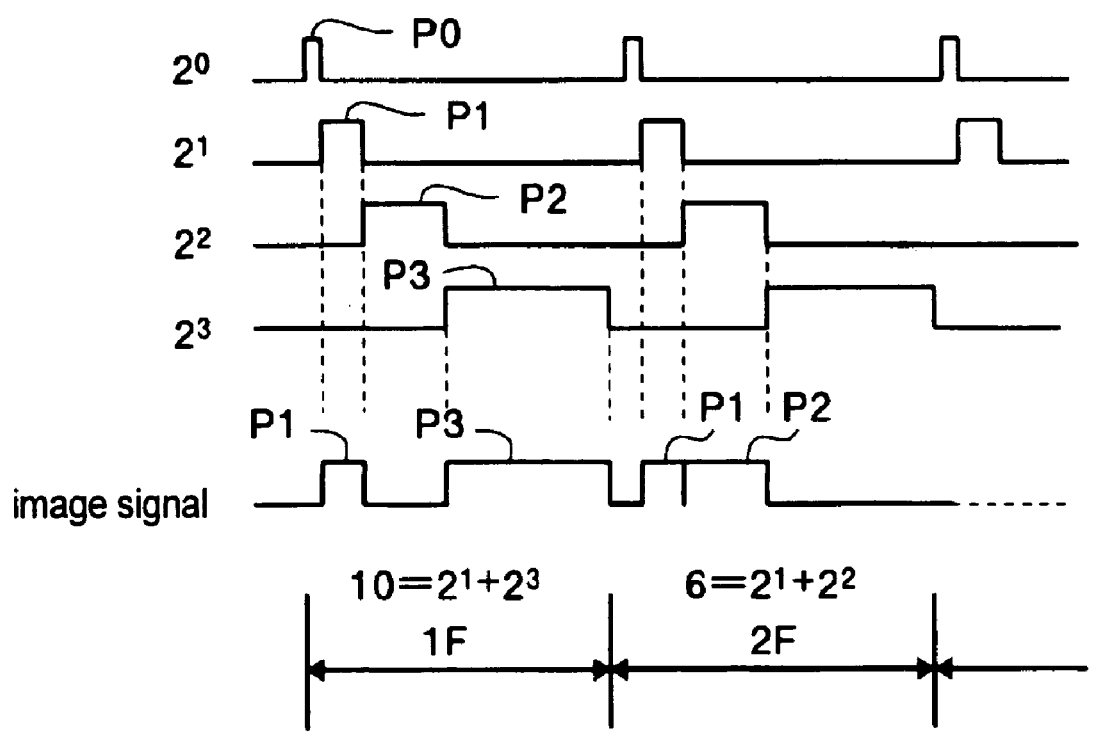
FIG. 3B is a time chart for explaining the pulse width modulation.

FIG. 3B shows a timing chart of the sub-frame pulse signals P0, P1, P2, and P3 and an example of an image signal. For example, as shown in FIG. 3B, if the depth of the image in a display period of frame 1F is level 10, the light is projected during the period of the sub-frame pulse signal P1 and the period of the sub-frame pulse signal P3. As a result, the integration of the light projection time in the frame 1F expresses the depth of the image actually observed. If the depth of the image changes from level 10 to level 6 in the frame 2F, in the same manner as the frame 1F, the light is projected during the period of the sub-frame pulse signal P1 and the period of the sub-frame pulse signal P2.

Figure 4:
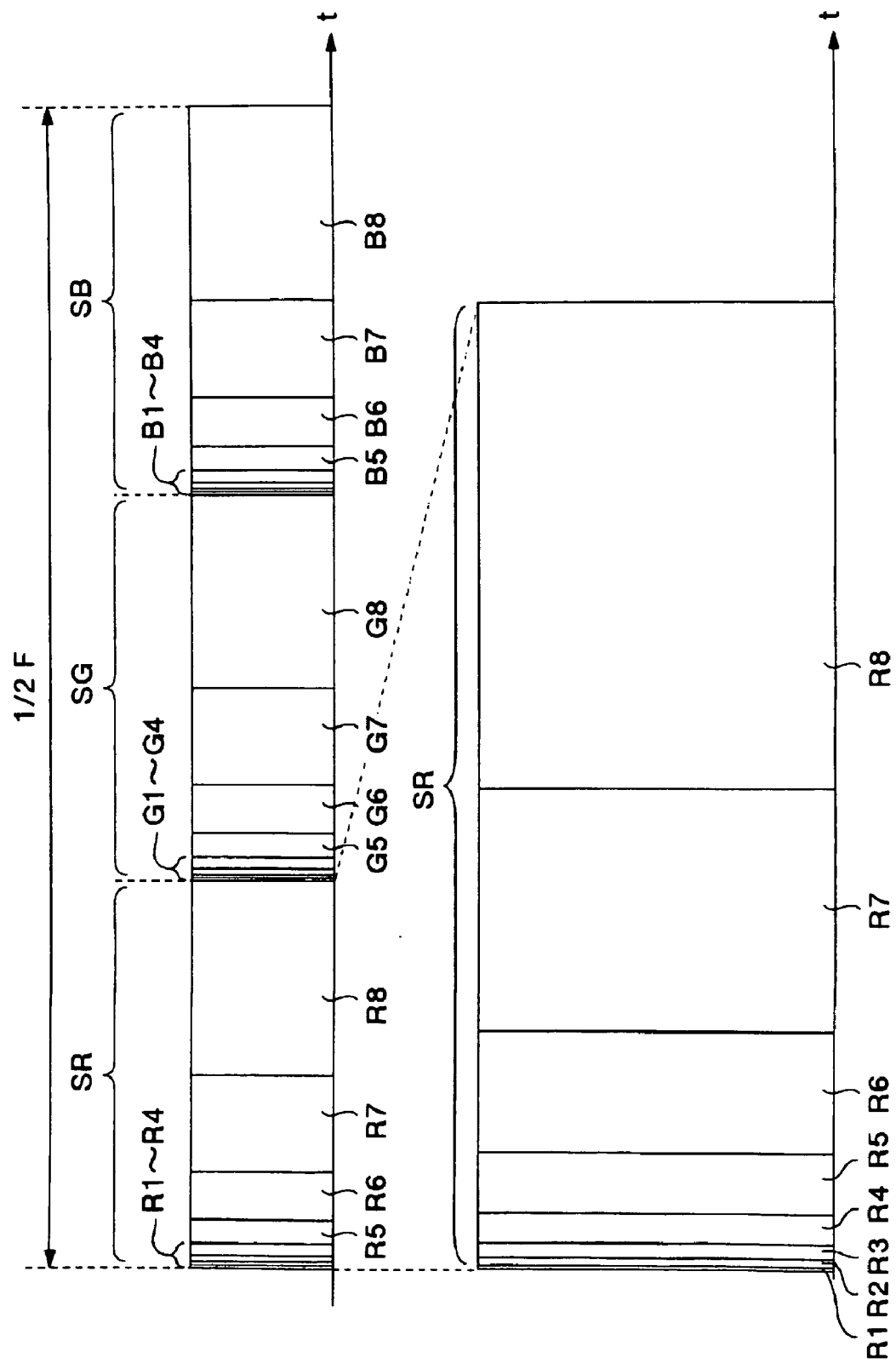
FIG. 4 is a time chart showing an example of a sub-frame pulse signals for a related art projector.

FIG. 4 shows an example of sub-frame pulse signal timing in a related art projector. In the timing chart shown in FIG. 4, the horizontal axis expresses time t, and the light is assumed to be projected during the period of all the sub-frame pulse signals. In the timing chart shown in FIG. 4, the depth of each of the red image, the green image, and the blue image is assumed to be expressed with 256 levels (8 bits). Regarding the red image, the depth is expressed using eight sub-frame pulse signals R1 ($=2^0$), R2 ($=2^1$), ..., R7 ($=2^6$), and R8 ($=2^7$). Regarding the green image, the depth is expressed using eight sub-frame pulse signals G1 ($=2^0$), G2 ($=2^1$), ..., G7 ($=2^6$), and G8 ($=2^7$). Regarding the blue image, the depth is expressed using eight sub-frame pulse signals B1 ($=2^0$), B2 ($=2^1$), ..., B7 ($=2^6$), and B8 ($=2^7$). For reference, an enlarged view of an arrangement SR of sub-frame pulse signals for the R light is shown in FIG. 4. As shown in FIG. 4, in the related art projector, a half frame period (denoted as ½F in FIG. 4) is divided into three sections, for example, respectively corresponding to the arrangement SR of sub-frame pulse signals for the R light to express the depth of red, an arrangement SG of sub-frame pulse signals for the G light to express the depth of green, and an arrangement SB of sub-frame pulse signals for the B light to express the depth of blue.

The related art projector sequentially separates the R light, the G light, and the B light in chronological order from the light from a very high pressure mercury lamp using, for example, a color wheel. The color wheel includes an R light transmitting dichroic film to transmit the R light only, a G light transmitting dichroic film to transmit the G light only, a B light transmitting dichroic film to transmit the B light only. When the light from the light source enters the R light transmitting dichroic film, only the R component of the light is transmitted. The R light transmitted through the R light transmitting dichroic film is then supplied to the spatial light modulator.

In this case, the period in which the light from the light source enters the R light transmitting dichroic film is synchronized with the period of the arrangement SR of the sub-frame pulse signals for the R light. Thus, the period of supplying the R light to the spatial light modulator from the color wheel can be synchronized with the period of the arrangement SR of the sub-frame pulse signals for the R light. Regarding the G light and the B light, as is the case with the R light, both the period of supplying the G light to the spatial light modulator from the color wheel and the period of supplying the B light are respectively synchronized with the arrangement SG of the sub-frame pulse signals for the G light and the arrangement SB of the sub-frame pulse signals for the B light.

Assuming that the display period of one frame is 1/60 second, if the R light, the G light, and the B light are switched at the timing as shown in FIG. 4, the frequency of displaying images is 120 Hz. In the related art, typical projectors have the image display frequency of 120 Hz. An observer recognize full color images by the afterimages of respective displayed images of the R light, the G light, and the B light. However, if the R light, the G light, and the B light are switched according to the timing shown in FIG. 4 with the image display frequency of 120 Hz, the color break-up may occur. Particularly when moving images with moving outlines are displayed or when the observer moves the eye point on the displayed images, the color break-up occurs more frequently. The color break-up can cause degradation of projection images and eyestrain of the observer caused by flickers of the images.

Figure 5:
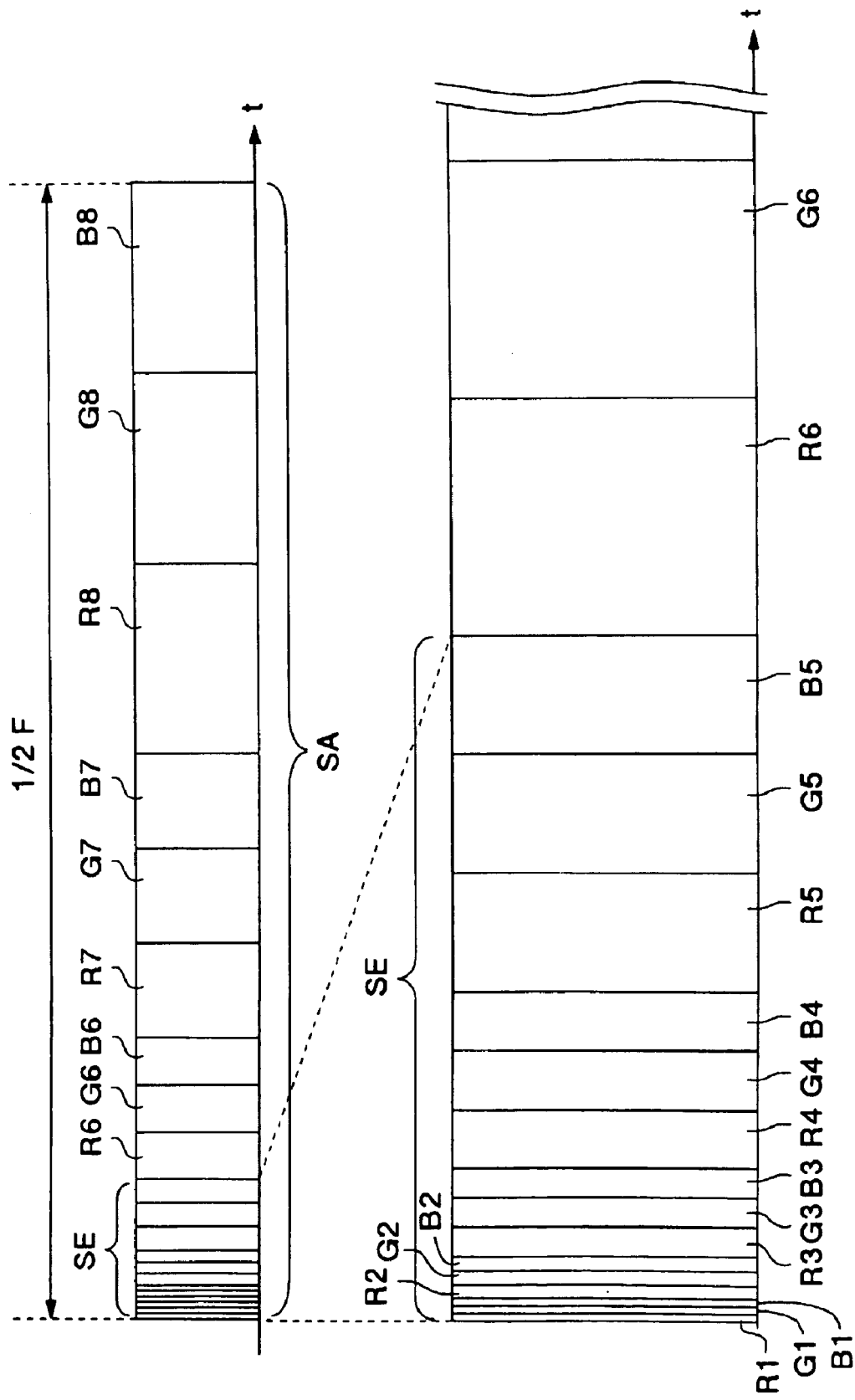
FIG. 5 is a time chart showing sub-frame pulse signals of a first exemplary embodiment.

FIG. 5 shows a timing chart of the sub-frame pulse signals in the projector 100 of the present exemplary embodiment. In the timing chart shown in FIG. 5, the horizontal axis expresses time t, and the light is assumed to be projected during the period of all the sub-frame pulse signals. The timing chart shown in FIG. 5, as is the case with the timing chart shown in FIG. 4, shows that a red image, a green image, and a blue image are expressed with 256 (8 bits) of depth levels. Note that the image display frequency in the projector 100 of the present exemplary embodiment is 120 Hz that is the same as in the related art projector shown in FIG. 4.

The projector 100 expresses the depth of images of the R light, the G light, and the B light with 8 bits of levels. Therefore, in generating sub-frame pulse signals for the first light, eight sub-frame pulse signals R1 through R8 for the R light and eight sub-frame pulse signals B1 through B8 for the B light having weights respectively corresponding to the first through eighth bits. And, in generating sub-frame pulse signals for the second light, eight sub-frame pulse signals G1 through G8 for the G light having weights respectively corresponding to the first through eighth bits.

Then the projector 100 arranges the sub-frame pulse signals R1 through R8 for the R light, the sub-frame pulse signals G1 through G8 for the G light, the sub-frame pulse signals B1 through B8 for the B light in the arranging the sub-frame pulse signals. The sub-frame pulse signal G1 for the G light is arranged adjacent to the sub-frame pulse signal R1 for the R light and the sub-frame pulse signal B1 for the B light. Likewise, the sub-frame pulse signal B1 for the B light is arranged adjacent to the sub-frame pulse signal G1 for the G light and the sub-frame pulse signal R2 for the R light.

The remaining sub-frame pulse signals for the respective colored light, R2 through R8, G2 through G8, and B2 through B8 are arranged in the same manner as the sub-frame pulse signals for the respective colored light, R1, G1, and B1. For reference, an enlarged view of a part SE of the sub-frame pulse signal arrangement is shown in FIG. 5. As shown, in the half frame period ½F of the image, the sub-frame pulse signals R1 through R8 for the R light and the sub-frame pulse signals B1 through B8 for the B light, with respect to all of the bits including the first bit, specifically the least significant bit through the eighth bit, specifically the most significant bit, are arranged adjacent to either one of the sub-frame pulse signals for the G light (either one of the sub-frame pulse signals G1 through G8 for the G light) respectively corresponding to the first through the eighth bits.

The sub-frame pulse signals for the respective colored light, R1 through R8, G1 through G8, and B1 through B8 are thus arranged. The arrangement of the sub-frame pulse signals for the respective colored light in the present exemplary embodiment differs from the arrangement of the sub-frame pulse signals for the respective colored light in the related art projector that is divided into three sections SR, SG, and SB for the respective colored light (See FIG. 4.) in the point that the greater number of sub-frame pulse signals for different colored light are arranged adjacent to each other.

As shown in FIG. 5, in the arrangement of the sub-frame pulse signals according to the present exemplary embodiment, the sub-frame pulse signals R1, G1, and B1 corresponding to the first bit are arranged at the beginning of the half frame period ½F. Following the sub-frame pulse signals R1, G1, and B1 corresponding to the first bit, arranged are the sub-frame pulse signals R2, G2, and B2 corresponding to the second bit. The sub-frame pulse signals R3 through R8, G3 through G8, and B3 through B8 respectively corresponding to the third through the eighth bits are arranged in the same manner as the sub-frame pulse signals R1, R2, G1, G2, B2, and B2 respectively corresponding to the first and the second bits.

As described above, the projector 100 of the present exemplary embodiment arranges the sub-frame pulse signals R1 through R8 for the R light, the sub-frame pulse signals G1 through G8 for the G light, and the sub-frame pulse signals B1 through B8 for the B light so as to be adjacent to each other with respect to respective one of the first bit through the eighth bit in the half frame period ½F of the image in the arranging the sub-frame pulse signals. Furthermore, the projector 100 of the present exemplary embodiment expresses any images of the R light, the G light, and the B light with 8 bits of depth. If the images of the respective colored light are expressed with 8 bits, the sub-frame pulse signals for the respective colored light can be arranged exactly one after the other by providing 8 sub-frame pulse signals for each colored light.

As shown in FIG. 5, in driving the movable mirror elements, the spatial light modulator 104 drives the movable mirror elements based on the sub-frame pulse signals for the R light, the sub-frame pulse signals for the G light, and the sub-frame pulse signals for the B light arranged in arranging the sub-frame pulse signals. In the related art projector, switching of the colored light in the sub-frame pulse signals occurs two times, namely switching from the R light to the G light occurring once and switching from the G light to the B light occurring once (See FIG. 4.) in the half frame period ½F.

In contrast, as shown in FIG. 5, in the projector 100 of the exemplary present embodiment, the colored light switching in the sub-frame pulse signals occurs 23 (=8×3−1) times during the half frame period ½F. Furthermore, the first light source section 101RB and the second light source section 101G are lighted in sync with the sub-frame pulse signals arranged in the arranging the sub-frame signals. In the first light source section 101RB, the LED 102R for the R light is lighted in sync with the sub-frame pulse signals R1 through R8 for the R light, the LED 102B for the B light is lighted in sync with the sub-frame pulse signals B1 through B8 for the B light.

Further, in the second light source section 101G, the LED 102G for the G light is lighted in sync with the sub-frame pulse signals G1 through G8 for the G light. As described above, a larger number of switching between the R light, the G light, and the B light can be provided in the half frame period ½F without enhancing the driving speed of the spatial light modulator 104. By providing a larger number of times of switching between the R light, the G light, and the B light, it is possible to reducing the likelihood or preventing the displayed images of the R light, the G light, and the B light from being recognized as separated images. Thus, the advantage of reducing the color break-up and providing high quality projection images can be obtained.

As described above, in the projector 100 of the present exemplary embodiment, the sub-frame pulse signal for the R light and the sub-frame pulse signal for the B light are arranged adjacent to the sub-frame pulse signal for the G light with regard to each of the bits. However, the arrangement of the sub-frame pulse signals is not limited to this. For example, the arrangement is also possible in which at least three of the sub-frame pulse signals for the R light is adjacent to either one of the sub-frame pulse signals for the G light and also adjacent to either one of the sub-frame pulse signals for the B light.

For example, regarding the sub-frame pulse signals R1 through R7, G1 through G7, and B1 through B7 respectively corresponding to the first bit through the seventh bit, the sub-frame pulse signals for the same colored light are arranged adjacent to each other. And then, the sub-frame pulse signals R8, G8, and B8 corresponding to the eighth bit can be arranged adjacent to the sub-frame pulse signal B7 for the B light in this order. In this case, the sub-frame pulse R8 for the R light is adjacent to both the sub-frame pulse B7 for the B light and the sub-frame pulse G8 for the G light. Further, the sub-frame pulse G8 for the G light is adjacent to both the sub-frame pulse R8 for the R light and the sub-frame pulse B8 for the B light.

Thus, the number of times of switching the colored light in the order of the B light, the R light, the G light, and then the B light can be increased in the period from the period of the sub-frame pulse signal B7 for the B light to the period of the sub-frame pulse signal B8 for the B light. As described above, the sub-frame pulse signals for the first colored light corresponding to at least three bits are arranged to be adjacent to either one of the sub-frame pulse signals for the second colored light. By providing more times of switching between the R light, the G light, and the B light, it is possible to reduce the likelihood or prevent the displayed images of the R light, the G light, and the B light from being recognized as separated images from each other. Thus, the advantage of reducing the color break-up and providing high quality projection images can be obtained.

Note that, in the related art method of driving the spatial light modulator, one frame period is divided into three parts each corresponding to the sub-frame pulse signals for the respective colored light. Accordingly, the sub-frame pulse signals corresponding to only two bits are adjacent to the sub-frame pulse signals for the different colored light. In contrast to this, in the method of driving the spatial light modulator according to the present exemplary embodiment, the sub-frame pulse signals for each colored light corresponding to at least three bits are adjacent to the sub-frame pulse signals for the different colored light. Thus, the number of times of switching to the sub-frame pulse signal for the different colored light can be increased by at least one in comparison with the related art driving method.

As described above, the LEDs are used in the first light source section 101RB and the second light source section 101G of the projector 100. The LEDs are switched on and off quickly and in high frequency. Therefore, if the sub-frame pulse signals for the different colored light are arranged one after the other and the sub-frame pulse signals for the different colored light are switched in high frequency, only the colored light corresponding to the sub-frame pulse signals can be sequentially put on.

The case is considered in which the color wheel is used to express the depth using the timing shown in FIG. 5, as is the case with the projector of the present exemplary embodiment. In this case, the R light dichroic film, the G light dichroic film, and the B light dichroic film of the color wheel are provided so as to be synchronized with the sub-frame pulse signals for the respective colored light shown, for example, in FIG. 5. Then, the period of the sub-frame pulse signal R1 is synchronized with the period in which the light from the light source is transmitted through the R light dichroic film, and the period of the sub-frame pulse signal G1 is synchronized with the period in which the light from the light source is transmitted through the G light dichroic film.

In this case, according to the timing shown as a present exemplary embodiment, it is necessary to switch quickly between the R light, the G light, and the B light. Particularly in the period of the arrangement SE of the sub-frame pulse signals shown in FIG. 5, switching timing of the colored light need to be quickly and accurately synchronized with switching of the sub-frame pulse signals. In case of the color wheel, it is difficult to provide the dichroic films so that the colored light is accurately synchronized with the sub-frame pulse signals for the corresponding colored light, particularly in the period of the arrangement SE of the sub-frame pulse signals. Therefore, the projector 100 of the present exemplary embodiment uses the LEDs instead of the color wheel and the very high pressure mercury lamp. By using the LEDs for the first light source section 101RB and the second light source section 101G, there is an advantage of accurately synchronizing the colored light switching with the sub-frame pulse signal switching.

In the projector 100 of the present exemplary embodiment, the LEDs 102R for the R light and the LEDs 102B for the B light are disposed on the first light source section 101RB, and the LEDs 102G for the G light are disposed on the second light source section 101G. The arrangement of the LEDs is not limited to this. For example, the LEDs for all colored light are disposed on a single light source section. In case of using the single light source section, the projector 100 supplies the light from the light source section to the spatial light modulator 104 in a single direction.

Figure 6:
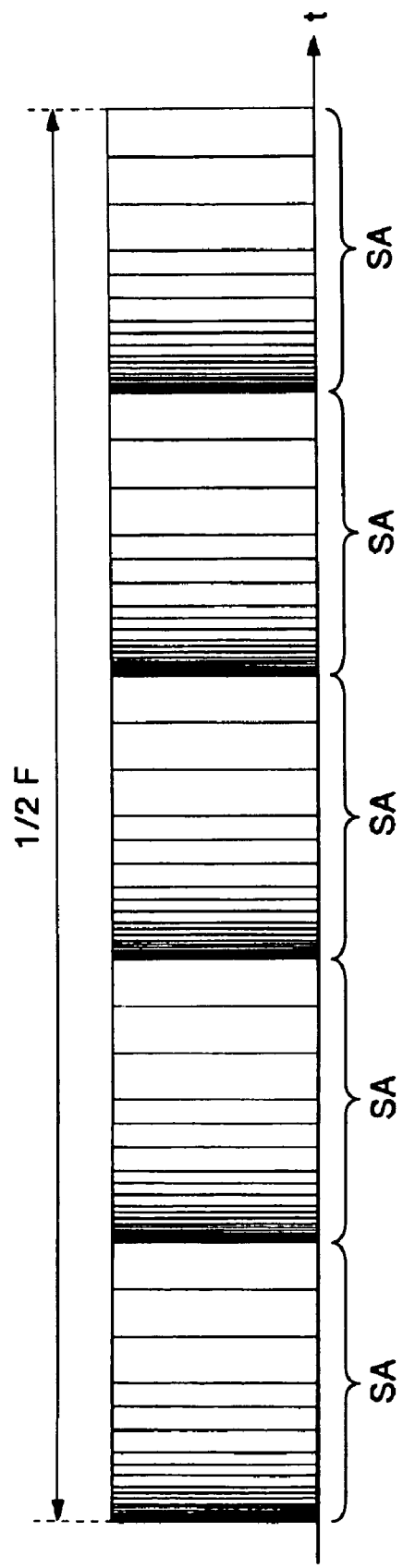
FIG. 6 is a time chart showing sub-frame pulse signals of a modification of the first exemplary embodiment.

FIG. 6 shows a timing chart of the sub-frame pulse signals in the projector according to a modified example of the first exemplary embodiment. The sub-frame pulse combination signal SA shown in FIG. 6 and the sub-frame pulse combination signal SA shown in FIG. 5 are the same in the arrangement of the sub-frame pulse signals. The projector of the modified exemplary embodiment uses the image display frequency of 600 Hz that is 5 times of 120 Hz. Thus, the advantage can be obtained that the driving speed is increased to further reduce the color break-up and the high quality projection images can be provided.

Exemplary Embodiment 2

Figure 7:
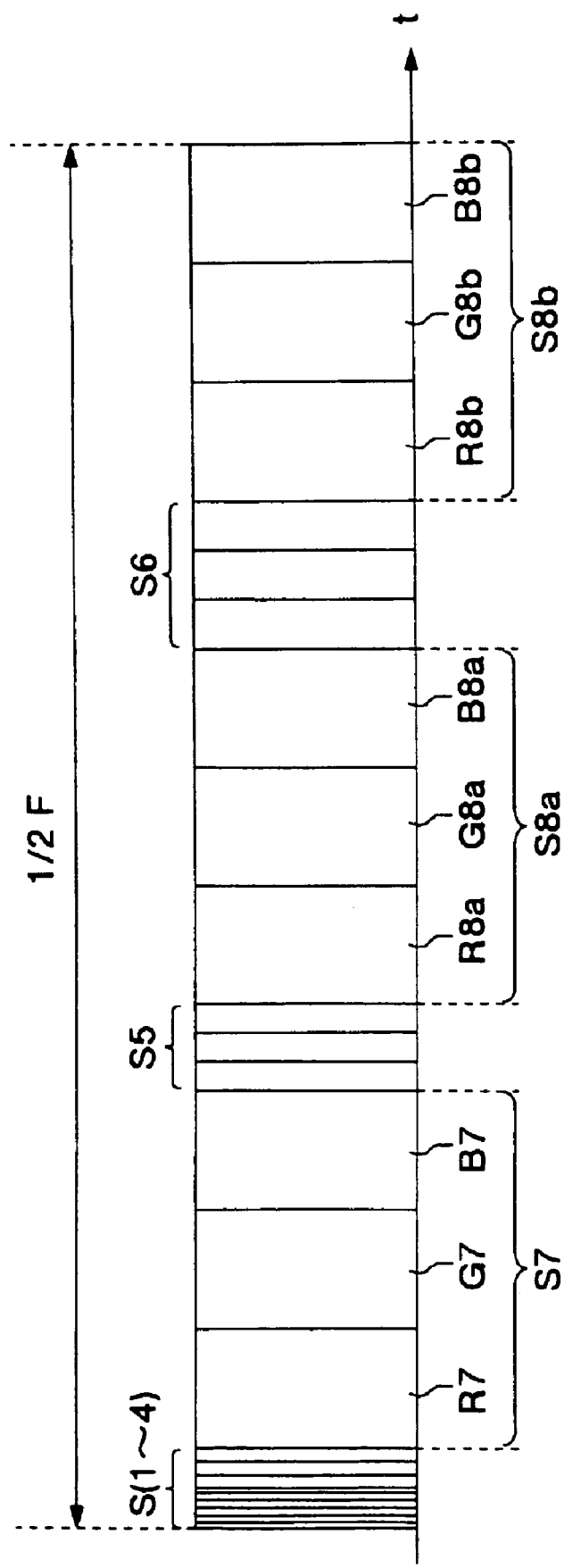
FIG. 7 is a time chart showing sub-frame pulse signals of a second exemplary embodiment.

FIG. 7 shows a timing chart of the sub-frame pulse signals in a projector according to the second exemplary embodiment of the present invention. The present exemplary embodiment has a feature of further dividing the sub-frame pulse signals R8, G8, and B8 used for arrangement of the sub-frame pulse signals in the first exemplary embodiment described above into two parts and then rearranging them. In the timing chart of the present exemplary embodiment, a combination of the sub-frame pulse signals S(1–4) has the same arrangement as the sub-frame pulse signals R1 through R4, G1 through G4, and B1 through B4 shown in FIG. 5. Furthermore, combinations of the sub-frame pulse signals S5, S6, and S7 have the same arrangement as the sub-frame pulse signals R5 through R7, G5 through G7, and B5 through B7.

The two sub-frame pulse signals R8a and R8b of the present exemplary embodiment are obtained by dividing the sub-frame pulse signal R8 shown in FIG. 5 into two parts. Each of the sub-frame pulse signals R8a and R8b has a weight of level 64 (64+64=$2^7$). The sub-frame pulse signals G8a, G8b, B8a, and B8b are also obtained by respectively dividing the sub-frame pulse signals G8 and B8 into two parts. Each of the sub-frame pulse signals G8a, G8b, B8a, and B8b has also a weight of level 64. The sub-frame pulse signals thus divided are arranged so as to be adjacent to the sub-frame pulse signals for the different colored light. By arranging the divided sub-frame pulse signals so as to be adjacent to the sub-frame pulse signals for the different colored light, the number of times of the color switching can further be increased.

Furthermore, by dividing the sub-frame pulse signals with significant weights and rearranging them, the period of projecting the same colored light is also divided. As a result, the color break-up can effectively reduced. Thus, the advantage of further reducing the color break-up and providing high quality projection images can be obtained. Note that the sub-frame pulse signals are not limited to be divided into two parts, but can be divided into three or more parts. Further, the divided sub-frame pulse signals are not limited to have the same weights but can have different weights from each other.

The weights of the sub-frame pulse signals are not limited to those corresponding to the respective bits but are freely decided by one level unit prior to the sub-frame pulse signals are divided. For example, the sub-frame pulse signal with the weight of level $2^7$ can be divided into two sub-frame pulse signals respectively having weights of level 30 and level 98. The weights of the divided sub-frame pulse signals are not limited to be the same irrespective of the color of the light but can be different depending on the color of the light. Furthermore, the order of the sub-frame pulse signals are not limited to the order of R, G, B, but any orders can be applied.

Modification of Exemplary Embodiment 2

Figure 8:
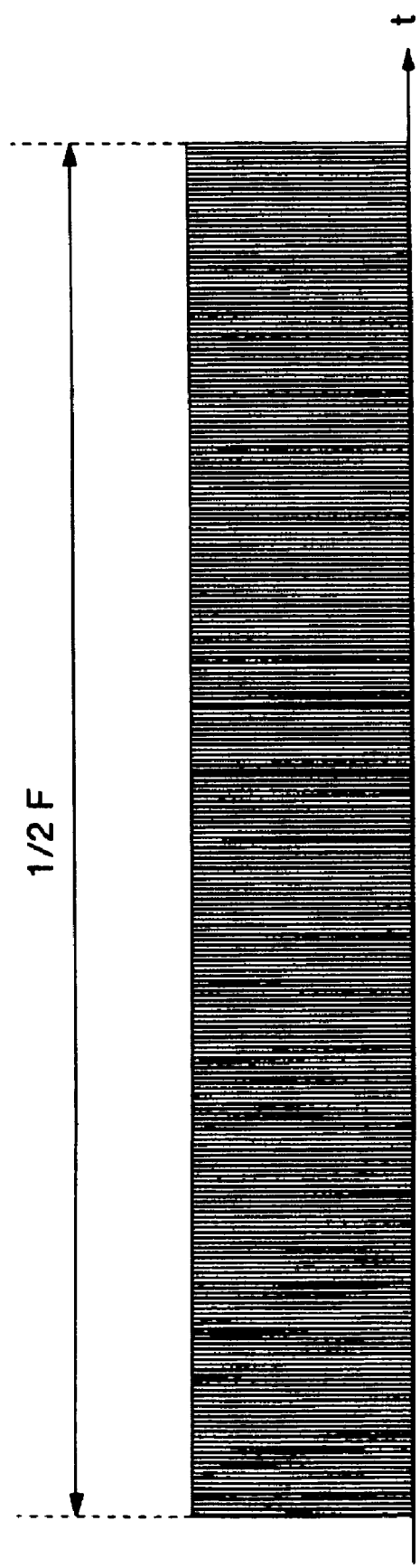
FIG. 8 is a time chart showing sub-frame pulse signals of a modification of the second exemplary embodiment.

FIG. 8 shows a timing chart of the sub-frame pulse signals in a projector according to a modification of the second exemplary embodiment. In this modified exemplary embodiment, all the sub-frame pulse signals of the first exemplary embodiment described above are divided into sub-frame pulse signals with the minimum weights of level 1. Each of the sub-frame pulse signals of the present modified exemplary embodiment is the dividable minimum unit when the image display frequency is 120 Hz that is the same as in the first exemplary embodiment described above. If the images of the respective colored light are expressed with 8 bits of depth, the sub-frame pulse signals for the each colored light are divided into 256 parts every half frame and then arranged.

If the sub-frame pulse signals thus divided are arranged so as to be adjacent to the sub-frame pulse signals for the different colored light, the maximum number of color switching can be obtained. Thus, when images are displayed with a predetermined frequency, the number of the color switching can be maximized to reduce the color break-up to the limit. In order to further increase the number of the color switching, the image display frequency must be increased. Although in the present modified exemplary embodiment, all of the sub-frame pulse signals have the weights of level 1, the weights can be changed depending on the color of the light if necessary. Thus, the same effect as changing the length of the unit bit as explained referring to FIG. 2B can be obtained to adjust the intensity balance of the respective colored light beams.

Exemplary Embodiment 3

Figure 9:
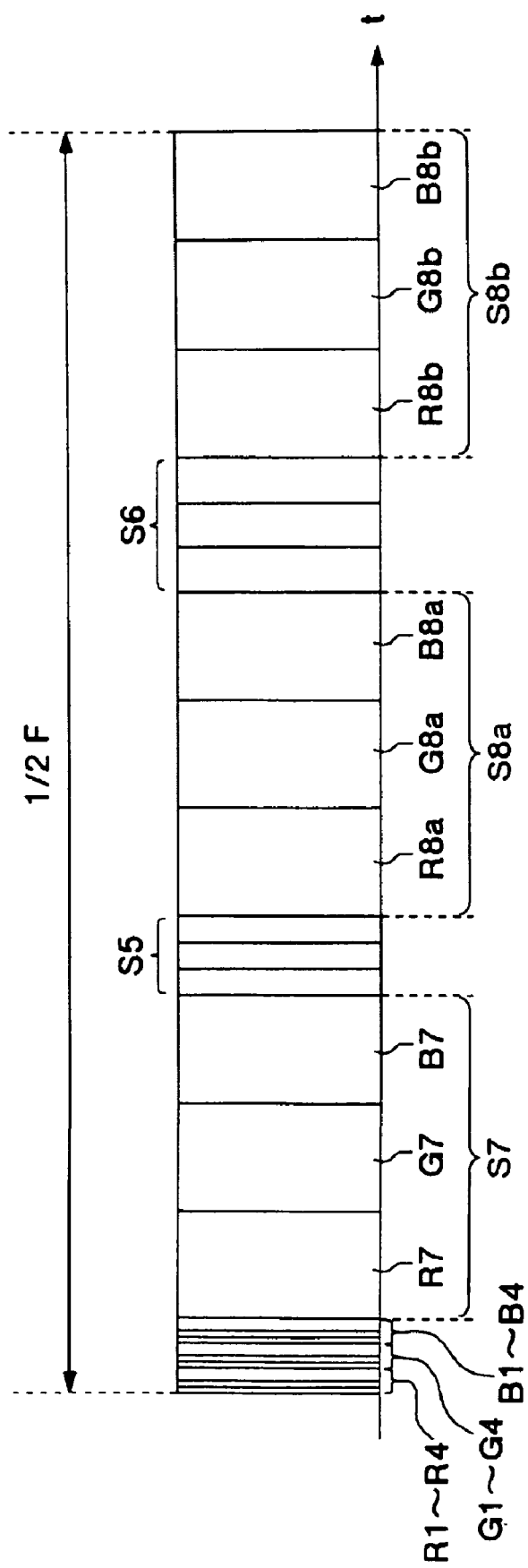
FIG. 9 is a time chart showing sub-frame pulse signals of a third exemplary embodiment.

FIG. 9 shows a timing chart of the sub-frame pulse signals in a projector according to the third exemplary embodiment of the present invention. The arrangement of the sub-frame pulse signals of the present exemplary embodiment is obtained by rearranging the sub-frame pulse signals of the second exemplary embodiment described above. The present exemplary embodiment has a feature of arranging a part of the sub-frame pulse signals so that the sub-frame pulse signals for the same colored light are adjacent to each other. In the half frame period ½F, sub-frame pulse signals R1 through R4 are arranged adjacent to each other. The sub-frame pulse signals G1 through G4, and B1 through B4 are also arranged to be adjacent to each other respectively.

In the present exemplary embodiment, out of the sub-frame pulse signals with weights corresponding to respective one of the 8 bits, the sub-frame pulse signals with weights not greater than level $2^3$ are arranged to be adjacent to the sub-frame pulse signals for the same colored light. The combination of the sub-frame pulse signals with weights not greater than level $2^3$ has the period (length) corresponding to the weight of level 15. If the color switching speed is fast enough, the color break-up can be reduced even if the sub-frame pulse signals for the same colored light are adjacent to each other. Regarding the sub-frame pulse signals with less significant weights, if the sub-frame pulse signals for the same colored light are adjacent to each other, the period in which the same colored light is continued to be projected is short enough. If the period in which the same colored light is continued to be projected is short enough, there is little effect to cause the color break-up. If the sub-frame pulse signals for the same colored light are adjacent to each other, the color break-up can be reduced in comparison with the related art arrangement shown in FIG. 4.

Furthermore, the more the sub-frame pulse signals for the same colored light are continued, the less the color switching occurs. Therefore, if the sub-frame pulse signals for the same colored light are arranged to be adjacent to each other, the light source can be driven more slowly. If the light source can be driven more slowly, the light source can be driven with a simpler circuit. Thus, the advantage of simplifying the composition of the drive circuit to reduce the cost of the projector can be obtained. As is the case with the second exemplary embodiment, the weights of the sub-frame pulse signals are not limited to those corresponding to the respective bits but are freely decided by one level unit.

Modification of Exemplary Embodiment 3

Figure 10:
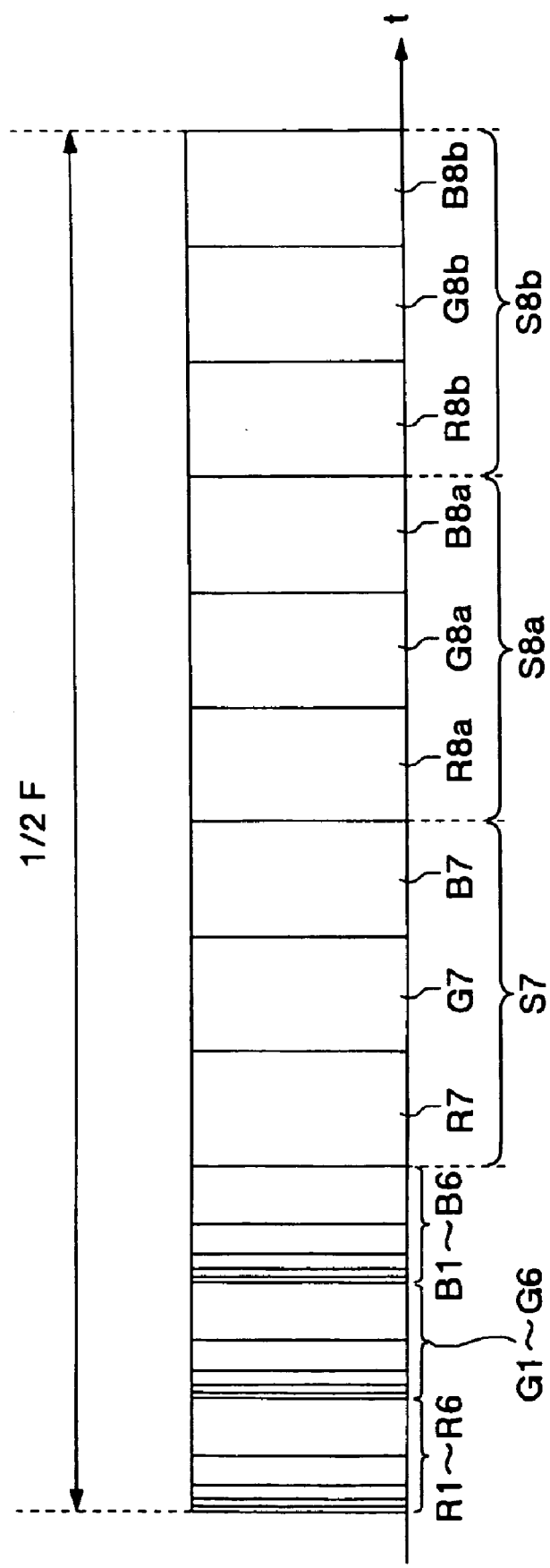
FIG. 10 is a time chart showing sub-frame pulse signals of a modification of the third exemplary embodiment.

FIG. 10 shows a timing chart of the sub-frame pulse signals in a projector according to a modification of the third exemplary embodiment. The present modified exemplary embodiment has a feature that each of the sub-frame pulse signals and combinations of the sub-frame pulse signals for the same colored light has substantially the same weight. In the present modified exemplary embodiment, in the half frame period ½F, the sub-frame pulse signals R1 through R6, G1 through G6, and B1 through B6 are arranged to be adjacent to each other respectively. The combination of the sub-frame pulse signals with weights not greater than level $2^5$ has, as a total, the period (length) corresponding to the weight of level 63.

In the combinations S7, S8a, and S8b of the sub-frame pulse signals, only the sub-frame pulse signals of level 64 are arranged. Therefore, in the present modified exemplary embodiment, the sub-frame pulse signals and the combinations of the sub-frame pulse signals have substantially the same weights. By thus arranging the sub-frame pulse signals, in accordance with the sub-frame pulse signals and the combinations of the sub-frame pulse signals for the same colored light, the lighting periods of the respective colored light are substantially the same.

If the lighting periods of the respective colored light are substantially the same, the light source can be driven more easily. Thus, the advantage of further simplifying the composition of the drive circuit to reduce the cost of the projector can be obtained. The sub-frame pulse signals can be defined to have the weights corresponding to respective bits such as level 64 or level 32, and also the weights not corresponding to any bits such as level 20. Furthermore, as is the case with the modified second exemplary embodiment, the weights of the sub-frame pulse signals can be modified depending on the color of the light.

Exemplary Embodiment 4

Figure 11:
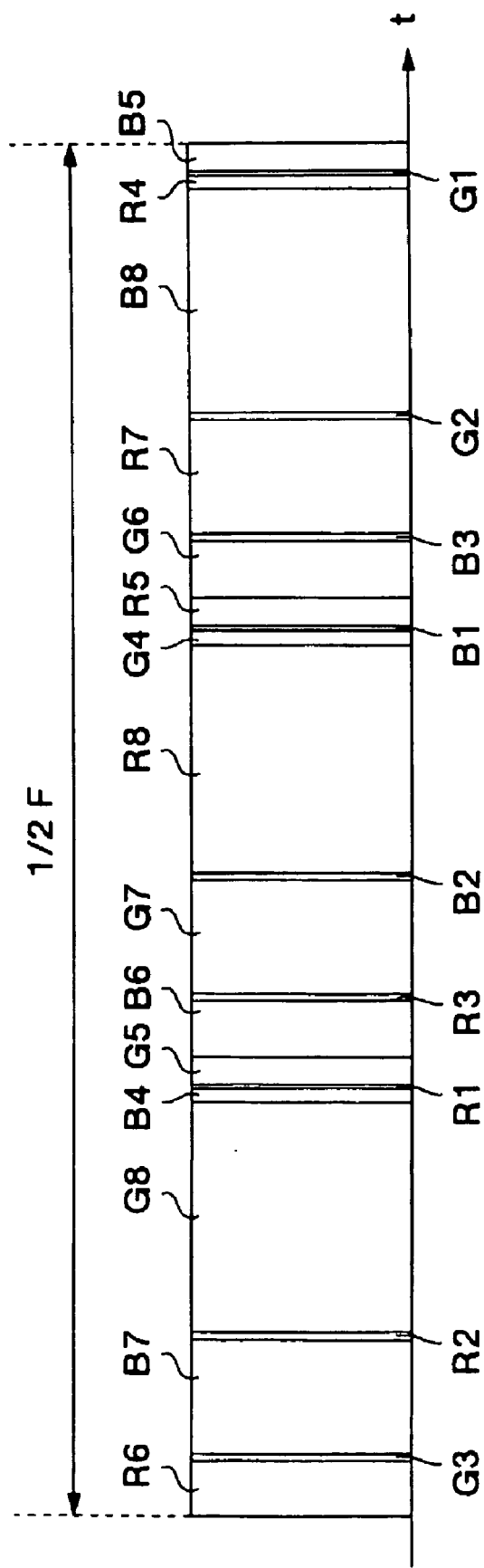
FIG. 11 is a time chart showing sub-frame pulse signals of a fourth exe exemplary embodiment.

FIG. 11 shows a timing chart of the sub-frame pulse signals in a projector according to the fourth exemplary embodiment of the present invention. The arrangement of the sub-frame pulse signals of the present exemplary embodiment is obtained by rearranging the sub-frame pulse signals according to the first exemplary embodiment as described above. In the half frame period ½F of the image, each of the sub-frame pulse signals R1 through R8 for the R light and the sub-frame pulse signals B1 through B8 for the B light is, with respect to all of the bits, from the first bit that is the least significant bit to the eighth bit that is the most significant bit, arranged to be adjacent to either one of the sub-frame pulse signals for the G light (either one of the sub-frame pulse signal G1 through G8 for the G light). Further, the sub-frame pulse signals for the R light, the sub-frame pulse signals for the G light, and the sub-frame pulse signals for the B light are arranged to be exactly one after the other.

The arrangement of the sub-frame pulse signals shown in FIG. 11 differs from the arrangement of the sub-frame pulse signals shown in FIG. 5 in that it is in disorder and the weights of the adjacent sub-frame pulse signals are not fixed. As the arrangement of the sub-frame pulse signals shown in FIG. 11, the arrangement in which the weights of the adjacent sub-frame pulse signals are not fixed is hereinafter referred to as "random sub-frame pulse signal arrangement."

Here, the case in which an image having the depth of level 63 is displayed is considered. If the depth of the R light in the image is expressed as level 63 using the sub-frame pulse signals R1 through R8, in the half frame period ½F, the R light is reflected towards the projection lens 105 to be projected during the periods of 6 sub-frame pulse signals R1, R2, R3, R4, R5, and R6 (R1+R2+R3+R4+R5+R6=63). Regarding the G light and the B light, as is the case with the R light, the G light and the B light are alternately projected during the periods of the sub-frame pulse signals G1 through G6 and B1 through B6 respectively.

Further, in the periods of the sub-frame pulse signals R7, R8, G7, G8, B7, and B8, the respective colored light is reflected towards somewhere other than the projection lens 105. In this case, if the arrangement of the sub-frame pulse signals shown in FIG. 5 of the first exemplary embodiment, the period in which the R light, the G light, or the B light is projected is included only in the first half of the half frame period ½F. And, the period in which the R light, the G light, or the B light is not projected is included only in the last half of the half frame period ½F. As described herein, the projection period of the respective colored light is concentrated on the first half of the half frame period ½F in the time line. As described herein, if the condition continues in which the projection periods of the respective colored light are unevenly distributed in the time line, flicker in the displayed images may occur.

Taking the above into consideration, if the random sub-frame pulse signal arrangement as shown in FIG. 11 is used, to display, for example, an image with the depth of level 63, any of the sub-frame pulse signals for the respective colored light R1 through R6, G1 through G6, and B1 through B6 is adjacent to the sub-frame pulse signals with the weight corresponding to the different bit. If any of the sub-frame pulse signals is adjacent to the sub-frame pulse signals with the weight corresponding to the different bit, the sub-frame pulse signal R1 through R6, G1 through G6, and B1 through B6 are arranged to be evenly distributed at random in almost the whole of the half frame period ½F.

Therefore, it is possible to reduce or prevent the projection periods of the respective colored light from being unevenly distributed in the time line in the half frame period ½F. If the arrangement of the sub-frame pulse signals shown in FIG. 5 of the first exemplary embodiment described above are used to display an image with the depth of other than level 63, the projection periods of the respective colored light may be unevenly distributed in the time line. By using the random sub-frame pulse signal arrangement, when the image with the depth of other than level 63 is displayed, as is the case with displaying the image with the depth of level 63, it is possible to reduce or prevent the projection periods of the respective colored light from being unevenly distributed in the time line.

By using the random sub-frame pulse signal arrangement, uneven distribution of the projection periods of the respective colored light in the time line can be reduced in the half frame period ½F. Thus, the advantage of reducing the flicker of the projection image can be obtained. The time line order of the sub-frame pulse signals R1 through R8, G1 through G8, and B1 through B8 is not limited to what is shown in FIG. 11 but can be changed if necessary. Furthermore, the time line order of the sub-frame pulse signals R1 through R8, G1 through G8, and B1 through B8 can be changed every half frame period ½F.

Furthermore, in addition to using the random sub-frame pulse signal arrangement, in accordance with the scene shown in the image, the pattern of the arrangement of the sub-frame pulse signals for the respective colored light R1 through R8, G1 through G8, and B1 through B8 can be changed scene by scene. Thus, it is possible to reduce or prevent the projection periods of the R light, the G light, and the B light from being unevenly distributed in the time line, and further, the arrangement can be adjusted to be suitable to the scene shown in the image. As a result, the advantage is obtained that the flicker of the image can be reduced, and further high quality projection images suitable for the scene shown in the images can be obtained.

The arrangement pattern of the sub-frame pulse signals can be set in accordance with, for example, the brightness of the image. For example, when displaying a dark image, the light is projected in accordance with the sub-frame pulse signals with less significant weights in the 1 frame period. In this case, by evenly distributing the sub-frame pulse signals with less significant weights in 1 frame period without deviation, it can be thought that flicker is reduced. In this manner, the arrangement pattern of the sub-frame pulse signals can be determined depending on the scene. It is possible to memorize, out of the random sub-frame pulse signal arrangement, some suitable patterns to, for example, levels of the depth and so on, and to select the pattern from the memorized patterns in accordance with the image signals.

Furthermore, as the sub-frame pulse signal of the present exemplary embodiment, the divided sub-frame pulse signals, as is the case with the second exemplary embodiment, can be arranged at random. The sub-frame pulse signals for the respective colored light are not limited to be arranged exactly one after the other, but arranged to be adjacent to the sub-frame pulse signals for the same colored light with regard to a part of the sub-frame pulse signals. Further, in the present exemplary embodiment, the weights of the sub-frame pulse signals are not limited to those corresponding to the respective bits. The weights of the sub-frame pulse signals can be freely decided by one level unit.

Note that the light source section is not limited to what uses solid state light emitting element, such as LED, providing that a device that can be driven at high speed is used in the light source section. For example, a solid state laser device, such as a semiconductor laser element, may be used. Further, the spatial light modulator used for the present invention is not limited to the DMD™. The spatial light modulator can be modified providing that it can express the depth of the image with the sub-frame drive method using PWM.

INDUSTRIAL APPLICABILITY

As described above, the method of driving a spatial light modulator of the present invention is suitable to control a spatial light modulator used in a projector.

What is claimed is:

1. A method of driving a spatial light modulator that modulates incident light in accordance with a signal corresponding to an image including a signal corresponding to an image of first colored light and a signal corresponding to an image of second colored light, comprising:
    generating no fewer than n and no more than $2^n$ ("n" denotes a positive integer) of sub-frame pulse signals for the first colored light to express depth of the image of the first colored light using n bits, the sub-frame pulse signals for the first colored light respectively having weights corresponding to the first through nth bits;
    generating no fewer than m and no more than $2^m$ ("m" denotes a positive integer and is not less than n) of sub-frame pulse signals for the second colored light to express depth of the image of the second colored light using m bits, the sub-frame pulse signals for the second colored light respectively having weights corresponding to the first through m bits;
    arranging the sub-frame pulse signals for the first colored light and the sub-frame pulse signals for the second colored light so that at least three of the sub-frame pulse signals for the first colored light adjoin either one of the sub-frame pulse signals for the second colored light during at least one frame of the image; and
    driving a plurality of movable mirror elements in accordance with the sub-frame pulse signals for the first colored light and the sub-frame pulse signals for the second colored light arranged when arranging the sub-frame pulse signals, the movable mirror elements being alternatively moved at least to a first reflecting position and a second reflecting position.

2. The method of driving a spatial light modulator according to claim 1, when arranging the sub-frame pulse signals, the sub-frame pulse signals for the first colored light and the sub-frame pulse signals for the second colored light being arranged so that each of the sub-frame pulse signals for the first colored light adjoins either one of the sub-frame pulse signals for the second colored light during at least one frame of the image.

3. The method of driving a spatial light modulator according to claim 2, when arranging the sub-frame pulse signals, the sub-frame pulse signals for the first colored light and the sub-frame pulse signals for the second colored light being arranged so that the sub-frame pulse signals for the first colored light and the sub-frame pulse signals for the second colored light further adjoin each other with regard to each of the weights including a minimum weight through a maximum weight during at least one frame of the image.

4. The method of driving a spatial light modulator according to claim 1, defining a sub-frame pulse signal combination as a combination of the sub-frame pulse signals for the first colored light and the sub-frame pulse signals for the second colored light arranged when arranging the sub-frame pulse signals so that the sub-frame pulse signals for the first colored light and the sub-frame pulse signals for the second colored light adjoin each other, more than one sub-frame pulse signal combinations being provided in one frame of the image in repeating fashion.

5. The method of driving a spatial light modulator according to claim 1, when arranging the sub-frame pulse signals, patterns of the arrangement of the sub-frame pulse signals for the first colored light and the sub-frame pulse signals for the second colored light being decided to be different from each other in accordance with the scene shown in the image.

6. The method of driving a spatial light modulator according to claim 1, the first colored light includes red light and blue light, and the second colored light includes green light.

7. The method of driving a spatial light modulator according to claim 1, the number of bits for expressing depth of the image of the first colored light and the number of bits for expressing depth of the image of the second colored light being equal.

8. A projector, comprising:
    a light source section to supply first colored light and second colored light;
    a spatial light modulator including a tilt mirror device equipped with a plurality of movable mirror elements alternatively moved at least to a first reflecting position and a second reflecting position, and to modulate incident light in accordance with a signal corresponding to an image; and
    a projection lens to project the light modulated by the spatial light modulator,
    the spatial light modulator being driven using the method of driving a spatial light modulator according to claim 1.

9. The projector according to claim 8, the light source section including a solid state light emitting element, and supplying the first colored light in sync with the sub-frame pulse signals for the first colored light and supplying the second colored light in sync with the sub-frame pulse signals for the second colored light.

* * * * *